(12) United States Patent
Dorpe

(10) Patent No.: US 11,754,825 B2
(45) Date of Patent: Sep. 12, 2023

(54) ILLUMINATOR, AN IMAGING APPARATUS AND A SYSTEM

(71) Applicant: IMEC VZW, Leuven (BE)

(72) Inventor: Pol Van Dorpe, Spalbeek (BE)

(73) Assignee: IMEC VZW, Leuven (BE)

( * ) Notice: Subject to any disclaimer, the term of this patent is extended or adjusted under 35 U.S.C. 154(b) by 219 days.

(21) Appl. No.: 17/107,974

(22) Filed: Dec. 1, 2020

(65) Prior Publication Data

US 2021/0191100 A1 Jun. 24, 2021

(30) Foreign Application Priority Data

Dec. 19, 2019 (EP) ..................................... 19218212

(51) Int. Cl.
*G02B 21/06* (2006.01)
*G02B 5/18* (2006.01)
(Continued)

(52) U.S. Cl.
CPC ......... *G02B 21/361* (2013.01); *G02B 5/1861* (2013.01); *G02B 21/02* (2013.01); *G02B 21/367* (2013.01)

(58) Field of Classification Search
CPC ................ G02B 21/00; G02B 21/0004; G02B 21/0016; G02B 21/0032; G02B 21/0052;
(Continued)

(56) References Cited

U.S. PATENT DOCUMENTS 3,975,084 A * 8/1976 Block ................ G01N 15/0205
356/244
7,619,725 B1 * 11/2009 Seaver ................... G01N 21/43
356/128
(Continued)

FOREIGN PATENT DOCUMENTS

EP 2469300 A1 6/2012
EP 3581919 A1 12/2019
(Continued)

OTHER PUBLICATIONS

Diekmann et al., "Chip-based wide field-of-view nanoscopy", Nature Photonics, vol. 11, No. 5, pp. 322-328, Apr. 24, 2017.
(Continued)

*Primary Examiner* — Thong Q Nguyen
(74) *Attorney, Agent, or Firm* — MOSER TABOADA

(57) ABSTRACT

An illuminator, comprising: an illumination waveguide, and a controller; the illumination waveguide being a planar waveguide configured to receive a light wave at a receiving end and guide it to a mirror end; the mirror end comprising a patterned mirror configured to reflect at least part of the light wave back into the illumination waveguide, the patterned mirror comprising a pattern configured to confer a diffraction pattern to the reflected light, the diffraction pattern contributing to an interference pattern, the interference pattern having an evanescent field outside the illumination waveguide, wherein the evanescent field of the interference pattern is configured to illuminate an object in close relation to the illumination waveguide; wherein the controller is configured to control a wavefront of the received light wave and to set a relation between the controlled wavefront and the pattern of the patterned mirror such that the interference pattern forms at least one element of constructive interference for selectively illuminating a portion of the object; wherein the controller is further configured to sequentially change the interference pattern.

10 Claims, 8 Drawing Sheets

(51) Int. Cl.
*G02B 21/36* (2006.01)
*G02B 21/02* (2006.01)

(58) Field of Classification Search
CPC ...... G02B 21/008; G02B 21/06; G02B 21/36; G02B 21/361; G02B 21/365; G02B 21/367
USPC .................................. 359/368–398, 558–576
See application file for complete search history.

(56) References Cited

U.S. PATENT DOCUMENTS

| 10,883,939 B2* | 1/2021 | Van Dorpe | G01N 21/648 |
| 2009/0290837 A1* | 11/2009 | Chen | G02B 6/305 |
| | | | 385/37 |
| 2015/0301325 A1 | 10/2015 | Kalkbrenner et al. | |
| 2017/0199029 A1 | 7/2017 | Raz | |
| 2019/0227293 A1 | 7/2019 | Bartal et al. | |

FOREIGN PATENT DOCUMENTS

| GB | 2549298 A | 10/2017 |
| WO | WO-2017/223041 A1 | 12/2017 |
| WO | WO-2018/202466 A1 | 8/2018 |

OTHER PUBLICATIONS

Helle et al., "Structured illumination microscopy using a photonic chip", arxiv.org, Cornell University Library, 201 Olin Library Cornell University Ithaca, NY 14853, Mar. 13, 2019.

Xu et al., "$Si_3N_4$ waveguide platform for label-free super-resolution imaging", simulation and analysis, Journal of Physics D: Applied Physics, vol. 52, No. 28, p. 284002, May 10, 2019.

Liu et al., "Wide-field 3D nanoscopy on chip through large and tunable spatial-frequency-shift effect", arxiv.org, Cornell University Library, 201 Olin Library Cornell University Ithaca, NY 14853, Jun. 27, 2019.

Extended European Search Report for Application No. EP 19218212. 9, dated May 8, 2020.

* cited by examiner

ILLUMINATOR, AN IMAGING APPARATUS AND A SYSTEM

CROSS REFERENCE TO RELATED APPLICATIONS

The present application is based on priority claimed on European Patent Application No. 19218212.9, filed on Dec. 19, 2019, the contents of which are incorporated herein by reference.

TECHNICAL FIELD

The present inventive concept relates to an illuminator for illuminating an object during imaging. In particular, the present inventive concept relates to high resolution microscopy.

BACKGROUND

Fluorescence microscopy is commonly used for studying samples in cell and molecular biology. The sample may be prepared by providing a fluorescent substance (fluorophore), that may be selectively bound to a part of the sample that is to be analyzed. Alternatively, an intrinsic fluorescence of the sample may be used in exciting fluorescent light from the sample.

Fluorescence microscopy may for instance be used in DNA sequencing. Although DNA sequencing has traditionally been performed in specialized locations using large, expensive equipment, there is a growing interest in enabling DNA sequencing in smaller laboratories and in hospital settings.

The resolution of fluorescent imaging techniques is limited by the diffraction limit. Therefore, there is an interest in super-resolution techniques for improving resolution, enabling more detailed imaging of objects and also enabling objects, such as DNA sequences to be more densely arranged while being imaged. However, super-resolution techniques normally suffer from bulky optical setups and, hence, are expensive.

It is presently known to use techniques for selectively exciting fluorophores that are surface bound. For instance, using total internal reflection microscopy (TIRF), evanescent excitation may be used for exciting only a thin portion of a sample at the surface of the sample holder. The evanescent excitation is based on a small portion of light escaping a surface in which total internal reflection occurs and intensity of the light will very quickly decrease with distance from the surface. Thus, a high vertical resolution may be obtained using TIRF illumination.

In Diekmann et al., "Chip-based wide field-of-view nanoscopy", Nature Photonics, vol. 11, pages 322-328, 2017, the use of an optical chip, which hosts the sample and provides a waveguide for the illumination source, and a standard low-cost microscope to acquire super-resolved images is disclosed. Waveguides composed of a material with high refractive-index contrast provide a strong evanescent field that is used for single-molecule switching and fluorescence excitation, thus enabling chip-based single-molecule localization microscopy. Additionally, multimode interference patterns induce spatial fluorescence intensity variations that enable fluctuation-based super-resolution imaging. The spatial fluorescence intensity variations are herein random.

SUMMARY

It is an objective of the invention to enable improved imaging of objects by providing a cost effective and compact illuminator. These and other objectives of the invention are at least partly met by the invention as defined in the independent claims. Preferred embodiments are set out in the dependent claims.

It is a realization of the invention that light may form an interference pattern within a waveguide and that if the waveguide is made of a high refractive index material the features of the interference pattern may be substantially smaller than the free space diffraction limit of the corresponding light. It is a further realization that the evanescent field of the interference pattern may be used to illuminate an object on-top of the waveguide or in close proximity to the waveguide. By controlling the interference pattern, different parts of the object may be illuminated and imaged. Several images taken under different illumination conditions may be combined to create a super resolution image. The inventive concept encompasses a first and a second aspect relating to two different illuminators for controlling the interference pattern. It is a realization that the first and second aspect may facilitate controllable interference patterns as opposed to random interference patterns. This may e.g. lead to faster imaging and improved resolution.

According to a first aspect of the invention there is provided an illuminator, said illuminator comprising:
an illumination waveguide and a controller;
the illumination waveguide being a planar waveguide with a receiving end and a mirror end,
the receiving end being configured to receive a light wave;
the planar waveguide being configured to confine light in a confinement direction by total internal reflection and guide the light wave in a guiding plane from the receiving end to the mirror end, wherein the confinement direction is normal to the guiding plane;
the mirror end comprising a patterned mirror, configured to reflect at least part of the light wave back into the illumination waveguide as reflected light, the patterned mirror comprising a pattern configured to confer a diffraction pattern to the reflected light, wherein the diffraction pattern contributes to an interference pattern in the illumination waveguide, the interference pattern having an evanescent field outside the illumination waveguide, wherein the evanescent field of the interference pattern is configured to illuminate an object in close relation to the illumination waveguide;
wherein the controller is configured to control a wavefront of the received light wave and to set a relation between the controlled wavefront and the pattern of the patterned mirror such that the interference pattern forms at least one element of constructive interference for selectively illuminating a portion of the object;
wherein the controller is further configured to sequentially change the interference pattern by changing the relation between the controlled wavefront delivered to the illumination waveguide and the patterned mirror such that different portions of the object becomes sequentially illuminated.

According to a second aspect of the invention there is provided an illuminator, said illuminator comprising:
an illumination waveguide and a controller;
the illumination waveguide being a planar waveguide with a receiving end, a first mirror end and a second mirror end, the receiving end being configured to receive a light wave;
the planar waveguide being configured to confine light in a confinement direction by total internal reflection and guide the light wave in a guiding plane from the receiving end to at least one of the first or second mirror ends, wherein the confinement direction is normal to the guiding plane and the optical modes of the waveguide comprise one or more discrete modes in the confinement direction and a continuous mode spectrum in the guiding plane;

the first mirror end comprising a first mirror, configured to reflect at least part of the light wave back into the illumination waveguide as a first reflected wave, the second mirror end comprising a second mirror configured to reflect at least part of the light wave or at least part of the first reflected wave back into the illumination waveguide as a second reflected wave, wherein the illuminating waveguide is configured to form an interference pattern in the illumination waveguide through interference between at least two of: the light wave, the first reflected wave, or the second reflected wave; the interference pattern having an evanescent field outside the illumination waveguide, wherein the evanescent field of the interference pattern is configured to illuminate an object in close relation to the illumination waveguide;

wherein the controller is configured to control a wavefront of the received light wave and to set a relation between the controlled wavefront and the first and second mirror such that the interference pattern forms at least one element of constructive interference for selectively illuminating a portion of the object;

wherein the controller is further configured to sequentially change the interference pattern by changing the relation between the controlled wavefront delivered to the illumination waveguide and the first and second mirror such that different portions of the object becomes sequentially illuminated.

The illuminators of the first and second aspect are configured to control forming of an interference pattern in the illumination waveguide, such that the interference pattern may be configured to select a portion of the object being imaged. The illuminator may be combined with an array of light-sensitive areas to form an imaging apparatus. The array of light-sensitive areas may herein be configured to sequentially detect light from the object, wherein the sequential illumination of the object is synchronized with the sequential detection of light from the object.

The at least one element of the interference pattern may be arranged to control a resolution of the imaging. By sequentially changing the interference pattern in relation to the object, different portions of the object may be illuminated in sequence. Thus, the imaging apparatus may be able to combine image information acquired in relation to different interference patterns such that an image of the entire object may eventually be formed. The array of light sensitive areas may herein sequentially detect light from the object in the form of an image series such that the image series may be combined into one single super resolution image.

An advantage of the illuminator is that it enables high vertical resolution. The vertical resolution herein referring to the resolution in a direction normal to the guiding plane. The use of a light wave propagating through total internal reflection in the illumination waveguide allows the object to be illuminated using the evanescent field of the light wave outside the illumination waveguide. Since an intensity of the evanescent field decreases rapidly with distance from the illumination waveguide, this implies that only objects or portions of objects arranged very close (in the order of 50-100 nm) to the illumination waveguide will be illuminated by the evanescent field. Thus, only these objects or portions of objects may contribute to the image.

Another advantage of the illuminator is that it enables high in-plane resolution. The in-plane resolution herein referring to the resolution in a plane, along the surface of the illumination waveguide, which is parallel with the guiding plane. The size of the at least one element of constructive interference controls a size of an area at a surface of the illumination waveguide which is illuminated. The controlled interference pattern may be formed within a material having a large refractive index and hence a resolution of the elements of the interference pattern may be higher than the free space diffraction limit. This implies that the smallest resolved details may be significantly smaller than a free space wavelength of light.

Another advantage of the illuminator is that it may be compact and cheap in comparison to many current illuminators for super resolution imaging. In particular, the illuminator may be compact and cheap in comparison to current illuminators which use a deterministic illumination pattern such as e.g. a structured illumination microscopy apparatus. In a conventional structured illumination microscopy apparatus, a movable diffraction grating may be placed between a light source and the imaged object. It is a realization of the invention that such an arrangement may require several lenses which are bulky and expensive. These requirements may be relieved with the current inventive concept. For example, the illumination light path of the illuminator may be made compact and of low complexity. There may e.g. be no need to introduce moving diffraction gratings in a free space optical light path to create an interference pattern.

The illumination waveguide may be made from a material with a refractive index which is higher than the refractive index of air (i.e. >1) and higher than the refractive index of other materials surrounding the illumination waveguide. This implies that total internal reflection may occur in the illumination waveguide. It may also ensure that a high resolution of imaging is enabled. In an embodiment, the refractive index of the material of the illumination waveguide may be much larger than the refractive index of air, such as >1.5, or even >1.8 to facilitate that small details of an object may be resolved by ensuring an interference pattern having elements with small dimensions may be formed. For instance, the illumination waveguide may be formed from any one of the following materials: niobium oxide (NbO) having refractive index n=2.37, silicon nitride (SiN) having refractive index n=1.9, titanium oxide (TiOx) having refractive index n=2.65 or gallium nitride (GaN) having refractive index n=2.4.

It should be understood that the received light wave may be a coherent light wave. The received light wave may be a monochromatic light wave. The received light wave may be a light wave of visible light. However, the light wave may also be a light wave of light outside the visible range, e.g. UV-light or IR-light. The light wave may originate from a coherent light source such as a laser, e.g. a laser diode or a solid state laser.

The receiving end of the illumination waveguide may e.g. be a facet of the illumination waveguide, e.g. an end facet. Light may e.g. be received at a facet by focusing the light on the facet using a microscope objective, a lensed optical fiber, or a tapered optical fiber. However, the light does not necessarily need to be focused on the facet. Light may also be received by e.g. coupling an optical fiber to the facet. The optical fiber may herein be a cleaved fiber. The fiber end may additionally be polished. Light may also be coupled into the illumination waveguide from another planar waveguide. Light may also be received by coupling a light source directly to the facet, e.g. by coupling a laser diode to the facet wherein the laser diode is moveable in relation to the facet. It should also be understood that the light wave does not necessarily need to be received via a facet of the illumination waveguide. Light may e.g. be coupled into the illumination waveguide via a grating coupler, the grating coupler being a plurality of grooves in the illumination waveguide.

In an illuminator according to the first aspect the controller may be configured to control a wavefront of the received light wave and to set a relation between the controlled wavefront and the pattern of the patterned mirror. In an illuminator according to the second aspect the controller may be configured to control a wavefront of the received light wave and to set a relation between the controlled wavefront and the first and second mirror. In either case an interference pattern may form and selectively illuminate a portion of the object.

The controller may be configured to control the wavefront of the delivered light wave by setting at least one of:

a wavefront center position, the wavefront center position being a position at the receiving end of the illumination waveguide where a central part of the wavefront is delivered;

a wavefront propagation direction, the wavefront propagation direction being a direction in which the wavefront propagates away from the receiving end of the illumination waveguide when it is guided by the illumination waveguide.

It is a realization of the invention that the interference pattern may be controlled by controlling how the light wave is launched into the illumination waveguide. This applies to illuminators according to the first aspect as well as toilluminnators according to the second aspect.

The wavefront center position may herein e.g. be a position in or on the illumination waveguide where the received light wave enters the illumination waveguide. The wavefront center position may e.g. be a position in or on the illumination waveguide where the received light wave is focused. For example, light may be focused on an end facet of the illumination waveguide or some distance into the illumination waveguide. The focus point may herein be the wavefront center position. In another example the light may be focused on a grating coupler on top of the illumination waveguide. The focus point on the grating coupler or in the waveguide below the grating coupler may herein be the wavefront center position.

The wavefront center position may also be a position on an interface between the illumination waveguide and another waveguide, wherein the position is the position where the light wave leaves the other waveguide and enters the illumination waveguide. For example, if a single mode waveguide is in contact with a facet of the illumination waveguide and a light wave is launched into the illumination waveguide from the single mode waveguide, then the wavefront center position may be a central position of the single mode in the single mode waveguide at the contact interface between the illumination waveguide and the single mode waveguide.

The wavefront propagation direction may herein e.g. be a direction in the guiding plane of the illumination waveguide, the direction being the direction into which the light is launched as the light enters the illumination waveguide. For example, if a plane wave strikes an end facet of the illumination waveguide and the plane wave has a direction within the guiding plane but at an angle of incidence to the normal of the end facet. Then the light may be refracted as it passes the end facet. The light may enter the illumination waveguide at an angle of refraction to the normal of the end facet. The angle of refraction may be related to the angle of incidence by Snell's law. The angle of refraction may herein define the wavefront propagation direction in the illumination waveguide.

It may be advantageous to control the wavefront of the delivered light wave by setting at least one of the wavefront center position or the wavefront propagation direction. This may e.g. be done by moving a light source in relation to the illumination waveguide. Moving a light source may e.g. be done using a motorized translation and/or rotation stage. For example, a translation stage may be used to set the wavefront center position and a rotation stage may be used to set the wavefront propagation direction. The stage or stages may or may not comprise a piezo actuator for fine adjustments. Setting the wavefront center position and/or the wavefront propagation direction may be a cheap way of controlling the interference pattern as translation/rotation stages may be relatively cheap in comparison to e.g. phase or wavelength control of the light.

It should be understood that additionally or alternatively the controller may be configured to control the wavefront of the delivered light wave by setting a wavefront shape.

The controller may comprise a light coupler, the light coupler comprising:

a grating coupler, the grating coupler being a plurality of grooves in the illumination waveguide, the plurality of grooves being configured to direct incident light into the illumination waveguide;

a moveable light source configured to illuminate the grating coupler to deliver the light wave, the moveable light source having a position and an illumination direction, the moveable light source position being a position of the moveable light source relative to a position of the grating coupler and the illumination direction being a propagation direction of light from the light source relative to a direction in the guiding plane of the illumination waveguide;

wherein the light coupler is configured to control the wavefront of the light wave received by the illumination waveguide by setting at least one of:

the moveable light source position such that the wavefront center position is controlled;

the movable light source illumination direction such that the wavefront propagation direction is controlled.

This applies to illuminators according to the first aspect as well as to illuminators according to the second aspect. It is a realization of the invention that a grating coupler may provide a robust way of coupling light into the illumination waveguide. The grating coupler may provide a large grooved area wherein light that strikes the illumination waveguide somewhere within the grooved area is to some extent coupled into the illumination waveguide. Thus, even if the light source is nudged a bit the interference pattern may be changed but not completely lost. Light may of course also be coupled into the illumination waveguide via e.g. an end facet of the illumination waveguide. However, to provide good light confinement the illumination waveguide may need to be relatively thin which results in an end facet of low height. If the incoming light is moved slightly above or below the end facet no light may enter the illumination waveguide and the entire interference pattern may be lost. Re-aligning to again couple light into the waveguide may be time consuming. Thus, coupling the light in via a grating coupler may be more user friendly and may also be more suitable for automated adjustments. Furthermore, a grating coupler may provide a high coupling efficiency. If a thin waveguide is used the coupling efficiency via an end facet may be low, a grating coupler may provide a higher coupling efficiency, e.g. due to its larger area. The grooves of the grating may be etched into the illumination waveguide. The depth of the grooves may be less than the thickness of the illumination waveguide. The grooves may be straight. The grooves may be essentially parallel to the patterned mirror of an illuminator according to the first aspect or essentially parallel to a first or second mirror of an illuminator according to the second aspect. The grooves may be periodically spaced. The period of the grooves may be an integer times the wavelength of the light wave divided by the refractive index of the illumination waveguide.

The movable light source may e.g. be a laser diode with a focusing lens or an optical fiber, e.g. a single mode optical fiber, with a focusing lens, wherein light is focused by the focusing lens on the grating coupler. However, a focusing lens may not necessarily be needed. Another waveguide or optical fiber, e.g. single mode optical fiber, may be placed in close proximity or in contact with the grating coupler to couple light into the illumination waveguide.

The controller may furthermore comprise a control processing unit, the control processing unit being configured to calculate the wavefront center position and/or the wavefront propagation direction needed to produce a specific interference pattern. The control processing unit may furthermore calculate the movable light source position and/or the movable light source illumination direction needed to produce a specific interference pattern.

According to a third aspect of the invention there is provided an imaging apparatus comprising an illuminator according to the first or second aspect, and an array of light-sensitive areas, the array of light-sensitive areas being configured to sequentially detect light from the object, wherein the sequential change of the interference pattern by the controller is synchronized with the sequential detection of light from the object.

Effects and features of this third aspect are largely analogous to those described in connection with the first and second aspects. Embodiments mentioned in relation to the first and second aspect are largely compatible with the third aspect.

Thus, an illuminator according to the first or the second aspect may be combined with an array of light-sensitive areas in order to provide imaging of an object based on the illumination of the object by the illuminator. It should be realized that the illuminator and the array of light-sensitive areas may be combined into a single apparatus, or even arranged on a common substrate. However, according to an alternative, the illuminator and the array of light-sensitive areas may be physically separate and may even be sold separately.

This implies that the interference pattern may be changed according to desire between subsequent frames in a sequence of acquired frames. Each frame acquired by the array of light-sensitive areas may be associated with a single interference pattern in the sequence.

The interference pattern may be changed in discrete steps, wherein the change of interference pattern may be controlled during read-out of a frame, such that when detection of a frame is initiated by the array, the interference pattern is stably formed in the illumination waveguide.

Hence, the information in each frame may be processed in correspondence with the interference pattern used when acquiring the frame.

Alternatively, the interference pattern may be continuously changed with a rate of change synchronized with the frame rate such that an element of the interference pattern has been moved a desired distance between subsequent frames in a sequence of acquired frames.

A synchronized change of the interference pattern may apply to illuminators according to the first aspect as well as to illuminators according to the second aspect.

The array of light-sensitive areas may e.g. be a charge-coupled device (CCD) or a complementary metaloxide-semiconductor (CMOS) image sensor. The array of light-sensitive areas and the illumination waveguide may be separate entities. For example, the illumination waveguide may be imaged through a microscope system. Objects on the surface of the illumination waveguide may be imaged onto the array of light-sensitive areas via a lens. However, the illumination waveguide may alternatively be integrated on a common substrate on which the array of light-sensitive areas is formed. Using a waveguide on top of the substrate with the light sensitive areas may provide several advantages. A first advantage is that it facilitates a compact imaging apparatus. A second advantage is that it facilitates a cheap imaging apparatus. For example, no moving lenses may be needed between the object and the array of light-sensitive areas. Imaging lenses or microscope objectives may be very expensive. A third advantage is that it facilitates fast imaging. If a common substrate is not used, a lens may be needed between the object and the array of light-sensitive areas. The lens may herein have a limited field of view such that the lens needs to be scanned over the illumination waveguide to cover the same area that may be covered with one single image using an array of light-sensitive areas in a common substrate. Furthermore, when a common substrate is used, more of the light from the object may be collected due to a close proximity between the array of light-sensitive areas and the object. This may lead to shorter integration times for each image. A fourth advantage is that the imaging apparatus may be formed using semiconductor manufacturing technology, which is suitable for mass production. The illumination waveguide may e.g. be monolithically integrated on the same substrate as the array of light-sensitive areas.

The imaging apparatus may comprise an image reconstruction unit, which is configured to receive a sequence of frames from the array of light-sensitive areas and to reconstruct an image of the object based on the sequence of frames.

This implies that the imaging apparatus may be able to also reconstruct the image such that the imaging apparatus may be able to output a high resolution image of the object. Hence, the imaging apparatus would not only detect information based on received light but may also form a reconstructed image based on an acquired sequence of frames.

However, it should be realized that alternatively, the imaging apparatus may output the information of the acquired frames to an external unit, which may perform reconstruction of the image.

According to a fourth aspect, there is provided a system for nucleic acid sequencing, comprising the imaging apparatus according to the third aspect.

Effects and features of this fourth aspect are largely analogous to those described in connection with the first, second and third aspect. Embodiments mentioned in relation to the first, second and third aspect are largely compatible with the fourth aspect.

The imaging apparatus may be incorporated in a system for nucleic acid sequencing. Thanks to a high resolution of the imaging apparatus, as provided by the control of the interference pattern, the imaging apparatus may be used for sequencing of a very dense pattern of nucleic acids. The system may for instance be used for detecting fluorescent light from the object, so as to detect labeled nucleic acids.

In the following, mirrors, used according to the inventive concept to create the interference pattern, will be discussed. The patterned mirror of the first aspect of the invention will be discussed separately from the first/second mirror of the second aspect of the invention.

As mentioned, in an illuminator according to the first aspect of the invention the illumination waveguide has a mirror end, the mirror end comprising a patterned mirror, configured to reflect at least part of the light wave back into the illumination waveguide as reflected light, the patterned mirror comprising a pattern configured to confer a diffraction pattern to the reflected light, wherein the diffraction pattern contributes to an interference pattern in the illumination waveguide. Furthermore, the controller according to the first aspect is configured to control a wavefront of the received light wave and to set a relation between the controlled wavefront and the pattern of the patterned mirror such that the interference pattern forms at least one element of constructive interference for selectively illuminating a portion of the object.

The mirror end may e.g. be located on a side of the illumination waveguide which is opposite to the receiving end. The patterned mirror may be a facet of the waveguide, e.g. an end facet. The facet may have a reflectance defined by the refractive index of the waveguide and the refractive index of the surrounding medium. The reflectance may be given by the Fresnel equations.

The pattern may be a pattern wherein the reflectance varies over the mirror end of the waveguide. The pattern may e.g. comprise reflective segments on the waveguide facet wherein the reflective segments have a higher reflectance than the rest of the waveguide facet. The reflective segments may e.g. be metal segments deposited on the waveguide facet, e.g. by evaporation. The reflectance may vary over the mirror end of the waveguide in a direction orthogonal to the confinement direction. The reflectance may vary as a function, the function may e.g. be a rectangular function, a saw tooth function, or a sine function. The pattern may also be a pattern wherein the phase of reflected light depends on which part of the pattern the light is reflected from. For example, the pattern may comprise one or more recesses in a facet of the waveguide, forming an indentation facet, such that light reflected from a recess in the indentation facet has a different phase compared to light reflected from a non-recessed part of the indentation facet.

It should also be understood that the patterned mirror may be created within the illumination waveguide, e.g. by the formation of a photonic crystal. A photonic crystal may be arrangement of micro- or nanostructures of varying dielectric constant. The photonic crystal may herein comprise a periodic structure of holes in the illumination waveguide that diffracts light propagating within the illumination waveguide.

It should also be understood that the patterned mirror may not necessarily be a part of a waveguide facet. The patterned mirror may be a patterned mirror in close proximity to a waveguide facet or associated with a waveguide facet. The patterned mirror may e.g. be a reflective diffraction grating or another reflective pattern which is in contact with a waveguide facet (e.g. an end facet), butt-coupled to a wave guide facet, or placed at a small distance from a waveguide facet, the distance being small enough for light to at least partially couple out of the waveguide and back into the waveguide. Thus, the mirror end of the waveguide may comprise both a waveguide facet and a separate patterned mirror.

It should be understood that the pattern configured to confer a diffraction pattern to the reflected light may be the pattern of a diffraction grating. The pattern may e.g. be a plurality of reflective lines on a non-reflective (or less reflective) surface, wherein the reflective lines extend in a direction normal to the guiding plane and wherein the reflective lines are periodically repeated in a direction within the guiding plane. The pattern may also be another periodic pattern, e.g. a plurality of reflective dots periodically repeating in a direction within the guiding plane. The pattern does not necessarily need to be periodic, it may e.g. consist of only two reflective lines which create a diffraction pattern of a double slit. It should also be understood that the inverse of the above examples, e.g. a pattern of non-reflective lines on a reflective surface may also produce a useful diffraction pattern according to Babinet's principle.

It should be understood that the diffraction pattern may make up the interference pattern on its own. For example, when the wavefront of the received light wave is guided in the guiding plane and strikes the patterned mirror a first part of the wavefront being reflected by a first part of the patterned mirror may interfere with a second part of the wavefront being reflected by a second part of the patterned mirror. Thus, the interference pattern may consist of only the diffraction pattern. The first and second part of the patterned mirror may herein be e.g. two different reflective lines or two different reflective segments. It should also be understood that the diffraction pattern may together with another light wave make up the interference pattern. For example, the diffraction pattern may e.g. be reflected back onto the light wave such that the diffraction pattern of the reflected light interferes with the received light wave to form the interference pattern. The illuminator may also comprise a second mirror, the second mirror may be patterned or non-patterned. The second mirror may be configured to reflect at least part of the light wave or at least part of the diffraction pattern as a second reflected wave. The diffraction pattern may then interfere with the second reflected wave to form the interference pattern.

It should be understood that the reflected light from the patterned mirror which is reflected back into the illumination waveguide may be reflected such that it overlaps with other light waves in the waveguide, e.g. the light wave or with a second reflected wave. However, it should also be understood that the diffraction pattern may be reflected into a region of the wave guide where no other light wave is confined.

It is a realization of the invention that by controlling the wavefront of the received light wave the wavefront that impinges the patterned mirror may be controlled. The relation between the wavefront and the pattern of the mirror may affect the diffraction pattern of the reflected light. Consider the following non-limiting example wherein two reflective segments on an end facet of the planar waveguide are being impinged by a circular wavefront. If an apparent center of origin of the circular wavefront lies in front of one of the reflective segments there may be a phase difference between light that is reflected by one reflective segment compared to the other. However, if the apparent center of origin of the circular wavefront lies in front of a point which is in the middle of the two reflective segments there may be no phase difference between light that is reflected by one reflective segment compared to the other. A center of origin being in front of a point on the end facet may herein mean that a line between the center of origin and the point on the end facet is orthogonal to the end facet. Thus, shifting the position of the received wave front may affect the phase difference between light which is reflected by different parts of the patterned mirror which in turn may affect the diffraction pattern. It is readily understood by the skilled person that the diffraction pattern may be controlled in many different ways, e.g. by controlling the position at which the light wave is received by the waveguide, the propagation direction of the received light wave or the shape of the wave front of the received light wave. For example, a light wave approaching two reflective segments on an end facet of the waveguide may not need to have a circular wave front, it may not need to approach the end facet along a direction perpendicular to the end facet and the path along which it approaches the end facet may be translated such that the wave front impinges the reflective segments in different ways.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
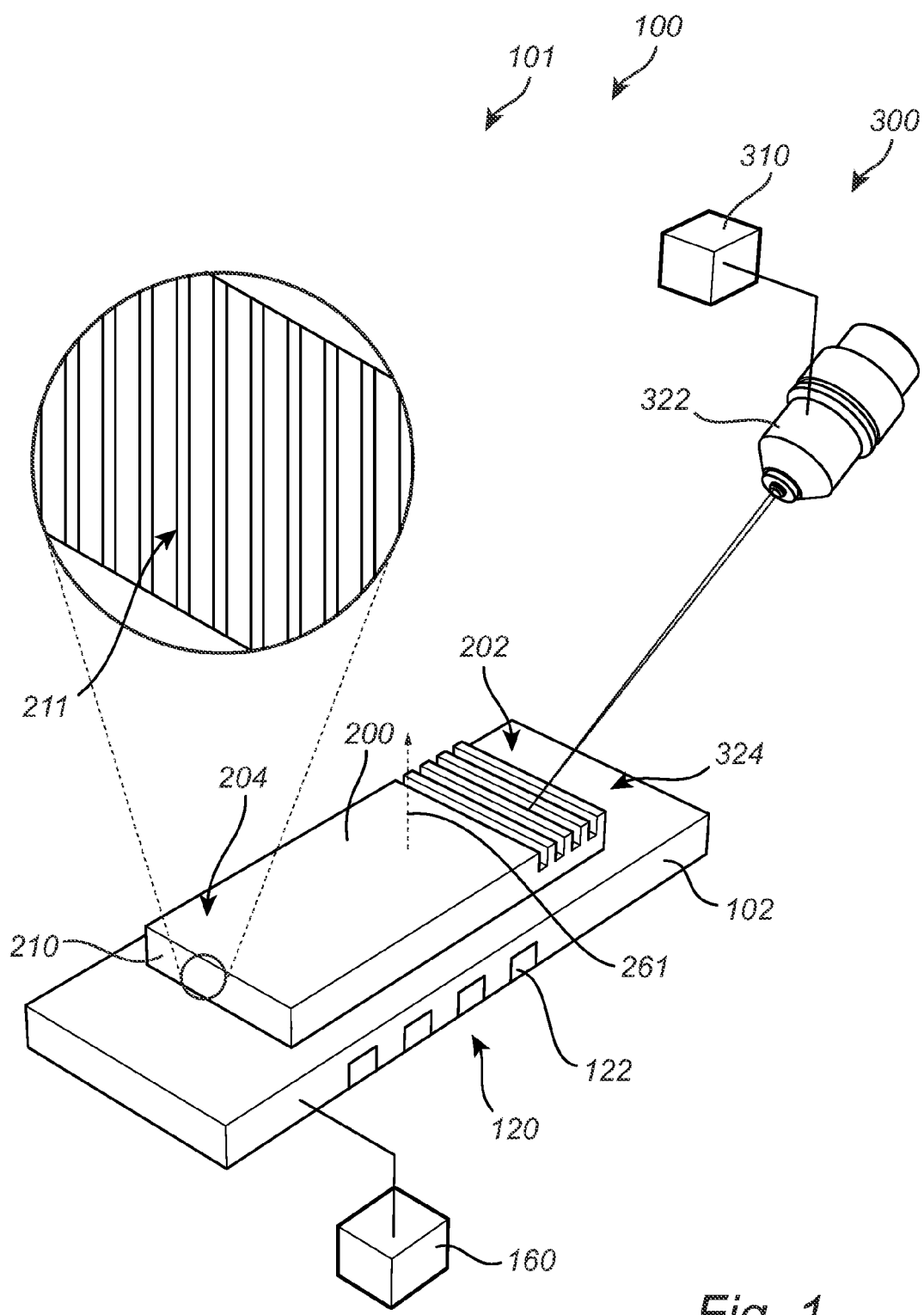
FIG. 1 is a perspective view of an imaging apparatus according to an embodiment.

An advantage of the invention according to the first aspect is that it enables improved imaging. The patterned mirror may make the interference pattern controllable and at least partially deterministic. Thus, a local intensity maxima in the interference pattern may be shifted controllably from one point in the waveguide to another by controlling the relation between the controlled wavefront delivered to the illumination waveguide and the patterned mirror. The pattern may be known so that the shift of the local intensity maxima in the interference pattern may be calculated ab initio. However, the shifts may of course not need to be calculated. The pattern may provide a means to reproducibly produce the interference pattern. A series of changes in the received wave front may give rise to a certain sequence of interference pattern. The series of changes in the received wave front may then be recreated at a later time, resulting in the same or a similar interference pattern. The controllable interference pattern may have an advantage over fluctuation based super resolution imaging. In fluctuation based super resolution imaging, such as e.g. [Diekmann et al., Nature Photonics, vol. 11, pages 322-328, 2017], random intensity fluctuations control the illumination pattern. When a controllable interference pattern is used fewer images may be required to create the super resolution image. Thus, the illuminator may facilitate fast imaging.

It should be understood that the pattern of the patterned mirror may be a periodic pattern. Thus, the patterned mirror may provide a periodic interference pattern. It may be easier to calculate how a periodic pattern of local intensity maxima should be sequentially shifted to effectively cover a certain object or area than it would be if the pattern of local intensity maxima was non-periodic or random. This may ease the computational requirements for the imaging apparatus. Thus, the imaging apparatus may operate faster and be made cheaper. The image quality may also be higher when a periodic pattern of local intensity maxima is used. A non-periodic pattern of local intensity maxima may have areas with more homogeneous illumination caused e.g. by a high or low density of local intensity maxima. Such homogeneous illumination areas may give rise to regions of the super resolution image having reduced resolution.

The periodic pattern of the patterned mirror may be configured to have a period of 0.1 to 100 times a wavelength of the received light wave. With such a periodicity the patterned mirror may provide an interference pattern with densely packed local maxima. This may provide a high resolution of the reconstructed image.

The pattern of the patterned mirror may comprise either of: a ridge and a valley in a side surface of the illumination waveguide; a diffraction grating in proximity to a side surface of the illumination waveguide, the diffraction grating comprising a plurality of light reflecting lines; or a photonic crystal, wherein the photonic crystal comprises a plurality of holes periodically arranged in the illumination waveguide.

A ridge and a valley in a side surface of the illumination waveguide may provide a means to affect the phase of reflected light. The phase may herein depend on which part of the pattern the light is reflected from. For example, ridges and valleys may provide one or more recesses in a facet of the waveguide, such that light reflected from a recess in the indentation facet has a different phase compared to light reflected from a non-recessed part of the facet. The patterned mirror may thus also comprise a plurality of ridges and valleys in a side surface of the illumination waveguide. The ridges and valleys may be etched into the illumination waveguide.

A diffraction grating may provide a very accurate periodic pattern. The diffraction grating may e.g. be a ruled diffraction grating or a holographic diffraction grating.

A photonic crystal may be etched into the illumination waveguide to provide an optical band structure to manipulate the reflected light.

As mentioned, in an illuminator according to the second aspect of the invention the optical modes of the illumination waveguide comprise one or more discrete modes in the confinement direction and a continuous mode spectrum in the guiding plane. Furthermore, the illumination waveguide has a first mirror end and a second mirror end, the first mirror end comprising a first mirror, configured to reflect at least part of the light wave back into the illumination waveguide as a first reflected wave, the second mirror end comprising a second mirror configured to reflect at least part of the light wave or at least part of the first reflected wave back into the illumination waveguide as a second reflected wave, wherein the illumination waveguide is configured to form an interference pattern in the illumination waveguide through interference between at least two of: the light wave, the first reflected wave, the second reflected wave.

It is a realization of the invention that an interference pattern may be created within the illumination waveguide also without a patterned mirror. When two mirrors are used, reflections from the different mirrors may interfere. Additionally, more mirrors may be used. For example, three or four mirrors may be used. The mirrors may also surround the entire illumination waveguide. The mirrors may herein be side facets of the illumination waveguide. Light may herein bounce back and forth in the illumination waveguide creating complex interference patterns. It is a realization of the invention that the illumination waveguide may not need to be a waveguide with discrete modes in the guiding plane that interfere with each other as described in [Diekmann et al., Nature Photonics, vol. 11, pages 322-328, 2017]. Instead an illumination waveguide with a continuous mode spectrum in the guiding plane may be used. This may enable a larger illumination waveguide such that a larger area may be imaged. A continuous mode spectrum may also make calculations of the interference pattern easier such that the interference pattern may be accurately predicted. Fewer images may then be needed to create a reconstructed image.

It should be understood that the first and the second mirror may be produced in many different ways. A sharp contrast between the waveguide refractive index and the refractive index of the waveguide surroundings may e.g. form a mirror. A metal coating on a waveguide facet may also form a mirror. A distributed Bragg mirror or a photonic crystal may also form a mirror. The first and the second mirror may be mirrors of the same type or of different types.

The planar waveguide may be configured to provide an optical width at least 10000 times larger than a wavelength of the received light wave, wherein the optical width is a product of a refractive index of the planar waveguide and a geometric width of the planar waveguide, the geometric width being a width of the planar waveguide in a direction orthogonal to both the confinement direction and a propagation direction of the received light wave.

Such an optical width may provide a continuous mode spectrum in the guiding plane for a light wave travelling in the propagation direction. In one example the planar waveguide is rectangular with two opposite short sides and two opposite long sides. In this example one short side may be used as a receiving end and the opposite short side is used as a mirror end. The light may then propagate from one short side to another and the optical width may be defined as the distance between the two long sides times the refractive index of the planar waveguide.

The illuminator may further comprising a layer structure, the layer structure comprising two or more flat layers on top of each other, each layer having a normal in the confinement direction, wherein one of the layers is the planar waveguide; wherein one of the layers is a substrate; wherein a first lateral surface of the layer structure comprises the first mirror, the first lateral surface being a flat surface of the layer structure comprising a lateral portion of each of the layers in the layer structure; wherein a second lateral surface of the layer structure comprises the second mirror, the second lateral surface being a flat surface of the layer structure comprising a lateral portion of each of the layers in the layer structure.

Such a layer structure may be produced by e.g. depositing a high refractive index material, e.g. SiN, as a planar waveguide layer on top of a substrate. The layered structure may subsequently be cleaved or diced. The cleaving surfaces or dicing surfaces may then form lateral surfaces as flat surfaces forming a cross-section of the layered structure. Herein, the lateral surface of the substrate and the lateral surface of the planar waveguide may form one single lateral surface. Thus, the side or end facets of the planar waveguide may be a cleaving surface or dicing surface, i.e. a surface formed by cleaving or dicing. Such a surface may be better suited to be used as a first or second mirror than an etched surface. The surface roughness may e.g. be better. Improved surface roughness may give a more predictable interference pattern as random reflections caused be a rough surface are removed or diminished.

The first and second lateral surface may also be a polished surface. For example, after e.g. cleaving or dicing the lateral surfaces may be polished. Polishing may further improve the surface roughness. When the lateral surface of the substrate and the lateral surface of the planar waveguide form one single lateral surface polishing may be enabled. It may e.g. not be possible to polish a lateral surface of the planar waveguide if it is formed by etching down to the substrate such that the lateral surface of the planar waveguide lies in a plane different from the lateral surface of the substrate.

It should be understood that the first and second mirror does not necessarily need to be formed by side or end facets of the illumination waveguide. In this context a first or second mirror may also be an external mirror in close proximity to a side or end facets of the illumination waveguide. The illumination waveguide may e.g. be butt coupled to the external mirror or adhesively bonded to the external mirror, the adhesive may herein have a refractive index similar to the refractive index of the illumination waveguide.

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

FIG. 1 illustrates an imaging apparatus 100. The imaging apparatus 100 comprises an illuminator 101 according to an embodiment of the first aspect of the invention. The illuminator 101 comprises an illumination waveguide 200 with a receiving end 202 and a mirror end 204. The illumination waveguide 200 may herein be configured to propagate one or more light waves by total internal reflection of light within the illumination waveguide 200. The illumination waveguide 200 may be formed from a material having a larger refractive index than surrounding substance.

The illumination waveguide 200 may e.g. be formed from SiN, which is suitable for transporting visible light, being essentially transparent to visible light, and is also suitable for monolithical integration on a semiconductor circuitry, since a layer of SiN may be formed without affecting an underlying semiconductor circuitry. Also, SiN has a refractive index facilitating total internal reflection in the illumination waveguide 200. However, it should be realized that other materials may alternatively be used in the illumination waveguide 200, as will be realized by a person skilled in the art. The illumination waveguide material may be deposited as a thin layer on top of a substrate 102 as illustrated in FIG. 1. The illumination waveguide 200 may have a thickness substantially smaller than its lateral dimensions. Thus, the illumination waveguide 200 is planar and confines light in a confinement direction 261 by total internal reflection and guide light in a guiding plane 260. The confinement direction 261 is herein normal to the guiding plane 260. The thickness of the illumination waveguide may herein be on the scale of e.g. 100 nm to 10 µm while the thickness of the substrate may be on the order of a few hundred µm. The illumination waveguide 200 may e.g. form a rectangular shape as illustrated in the FIG. 1. The lateral extension of the illumination waveguide 200 may e.g. be defined by etching. Thus, the lateral surface of the illumination waveguide 200 may lie in a plane different from the lateral surface of the substrate as illustrated in the FIG. 1. However, the lateral surface of the illumination waveguide 200 may also lie in the same plane as the lateral surface of the substrate.

As seen in the enlarged portion of FIG. 1 the mirror end 204 of the illumination waveguide 200 comprises a patterned mirror 210 with a pattern 211. In this illustration the pattern 211 is a periodic pattern comprising a plurality of lines on an end facet of the illumination waveguide 200. The lines may herein be periodically repeated along the lateral extension of the end facet.

As illustrated, light may be coupled in to the illumination waveguide 200 at the receiving end 202. The light may then propagate in the illumination waveguide 200 and reach the patterned mirror 210 at the mirror end 204. The light may subsequently be at least partially reflected back into the illumination waveguide 200 by the patterned mirror 210 wherein the pattern 211 confer a diffraction pattern to the reflected light. An interference pattern 104 may thus be formed within the illumination waveguide 200, the interference pattern 104 being either the diffraction pattern on its own or the diffraction pattern further interfering with other light. The interference pattern may have an evanescent field outside the illumination waveguide 200 which may illuminate objects on top of the illumination waveguide, either objects on the top surface of the illumination waveguide 200 or objects suspended in e.g. a liquid on top of the illumination waveguide 200.

Light from the illuminated object, e.g. fluorescence light, may be detected using an array 120 of light-sensitive areas 122. The array 120 of light-sensitive areas 122 may herein be a CCD or CMOS detector. As illustrated in FIG. 1 the array 120 of light-sensitive areas 122 may be integrated in the substrate 102, either on a top or bottom side of the substrate 102. The array 120 of light-sensitive areas 122 is configured to acquire a plurality of sequential frames corresponding to different arrangements of the interference pattern 104 in relation to the object. The sequence of frames may be used for reconstructing an image of the object.

The illuminator 101 in FIG. 1 comprises a controller 300 configured to control a wavefront 330 of the received light wave and to set a relation between the controlled wavefront 330 and the pattern 211 of the patterned mirror 210 such that the interference pattern 104 forms at least one element 106 of constructive interference for selectively illuminating a portion of the object. In FIG. 1 the controller comprises a movable light source 322 which may focus light on a point at the receiving end 202 of the illumination waveguide 200. By moving the movable light source 322, e.g. translating, rotating or tilting the movable light source 322, a wavefront 330 of the received light wave may be changed in relation to the pattern 211 of the patterned mirror 210. Thus, the interference pattern 104 may be changed by moving the movable light source 322. The movements of the movable light source 322 may be determined by a control processing unit 310. The control processing unit 310 may be implemented in hardware or as any combination of software and hardware. The control processing unit 310 may e.g. be a central processing unit (CPU).

The controller 300 is further configured to sequentially change the interference pattern 104 by changing the relation between the controlled wavefront 330 delivered to the illumination waveguide 200 and the patterned mirror 210 such that different portions of the object becomes sequentially illuminated, wherein the sequential illumination of the object is synchronized with the sequential detection of light from the object. The controller 300 may e.g. be configured to synchronize change of the interference pattern 104 with a frame rate of the array 120 of light-sensitive areas 122.

The imaging apparatus 100 in FIG. 1 further comprises an image reconstruction unit 160 configured to receive a sequence of frames from the array 120 of light-sensitive areas 122 and to reconstruct an image of the object based on the sequence of frames.

Frames from the array 120 of light-sensitive areas 122 may be received by the image reconstruction unit 160. The image reconstruction unit 160 may comprise information of a point-spread function of the imaging apparatus 100. Using the point spread function, the image reconstruction unit 160 may perform digital deconvolution for forming a reconstructed partial image based on the intensity of light detected in a frame. The reconstructed partial image may provide information of the portion(s) of the object illuminated during acquiring of the frame. The image reconstruction unit 160 may further combine a plurality of reconstructed partial images for forming of a complete image of the object.

The point spread function of the imaging apparatus 100 may be measured in a calibration performed after the imaging apparatus 100 has been manufactured and before the imaging apparatus 100 is shipped to a customer. The point spread function may thus be stored in the image reconstruction unit 160. When the imaging apparatus 100 is formed without any lens between the object and the array 120 of light-sensitive areas 122, the image reconstruction unit 160 may use a common point spread function for deconvolving the entire field of view.

To deal with noise, errors, and/or instabilities of the phase of the input waveguides, different approaches in reconstruction of the image can be considered. Blind structured illumination microscopy (SIM) and filtered blind-SIM are reconstruction algorithms that are able to process SIM data even if the illuminations are strongly distorted. Blind-SIM and filtered blind-SIM approaches reconstruct simultaneously sample and excitation patterns without a priori information on the latter. Pattern-estimation (PE) SIM, which is disclosed in Yeh, L.-H., Tian, L. & Waller, L., "Structured illumination microscopy with unknown patterns and a statistical prior", Biomedical Optics Express, vol. 8, pages 695-711, 2017, is an algorithmic self-calibration strategy for SIM that does not need to know the exact illumination patterns a priori.

Various algorithms have been proposed for single pixel imaging (SPI) reconstruction, including linear correlation methods, the alternating projection (AP) method, and compressive sensing (CS) based methods.

The image reconstruction unit 160 may be implemented in hardware or as any combination of software and hardware. For instance, the image reconstruction unit 160 may be implemented in a common CPU with the control processing unit 310 or in a separate CPU, wherein the CPU comprises software for providing functionality of the image reconstruction unit 160 in a general-purpose processor. Alternatively, the image reconstruction unit 160 may be implemented as firmware arranged in an embedded system on the common substrate 102. As a further alternative, the image reconstruction unit 160 may be implemented as a special-purpose circuitry for providing specific logical operations. Thus, the image reconstruction unit 160 may be provided in the form of an application-specific integrated circuit (ASIC), an application-specific instruction-set processor (ASIP) or a field-programmable gate array (FPGA).

Figure 2:
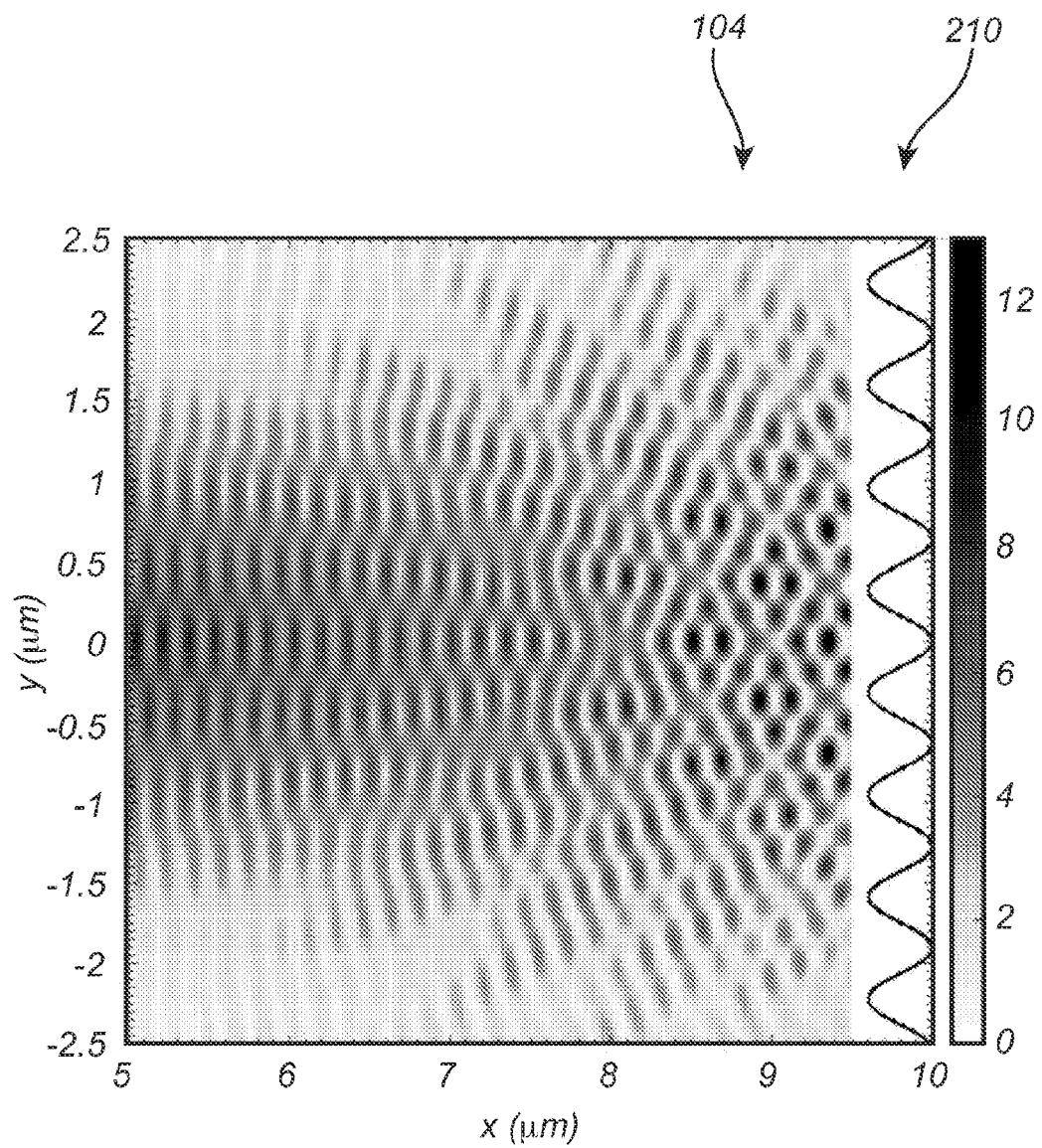
FIG. 2 is an interference pattern.

FIG. 2 is a plot of a calculated interference pattern 104 formed when a light wave propagating in an illumination waveguide 200 and coming in from the left in the plot to strike a patterned mirror 210 to the right in the plot. The pattern 211 of the patterned mirror is herein a sine function. A corresponding interference pattern 104 is expected to be seen as an evanescent field in a plane above the illumination waveguide 200.

Figure 3:
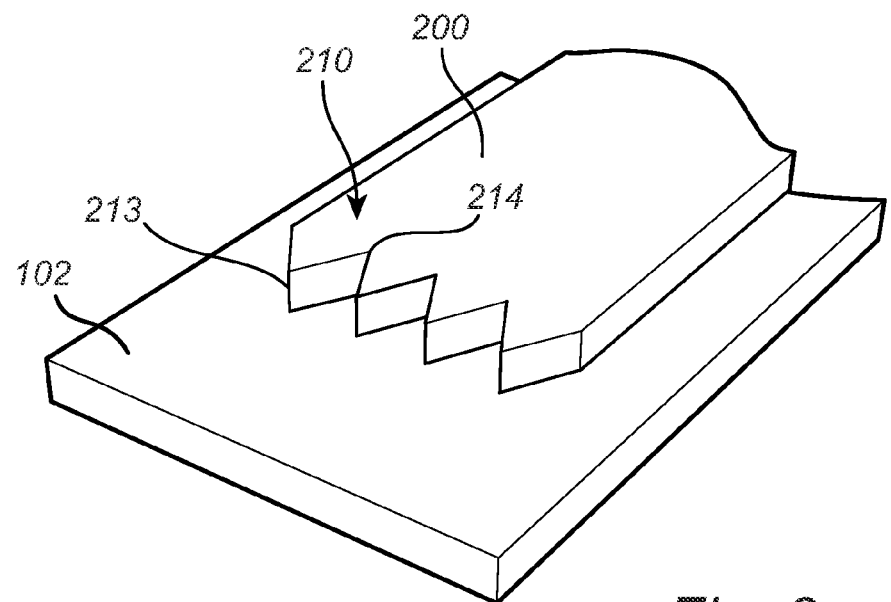
FIG. 3 is a close-up view of an illumination waveguide with a patterned mirror in the form of ridges and valleys in a side surface of the illumination waveguide.
Figure 4:
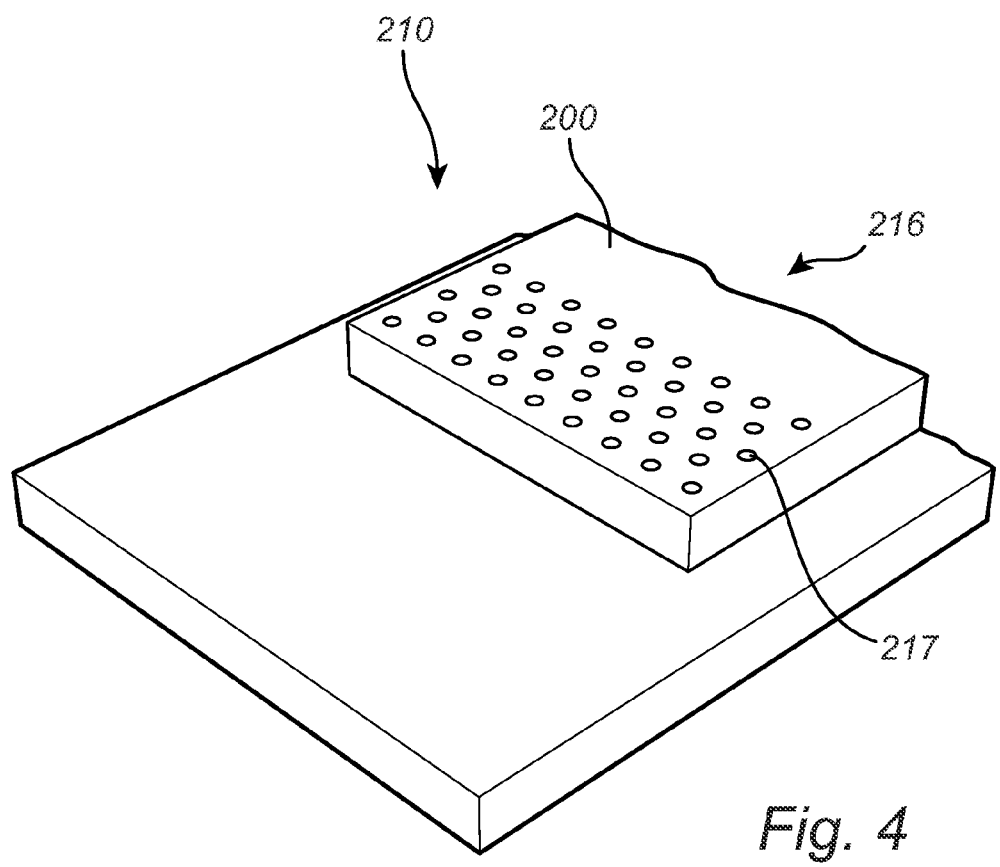
FIG. 4 is a close-up view of an illumination waveguide with a patterned mirror in the form of a photonic crystal.
Figure 5:
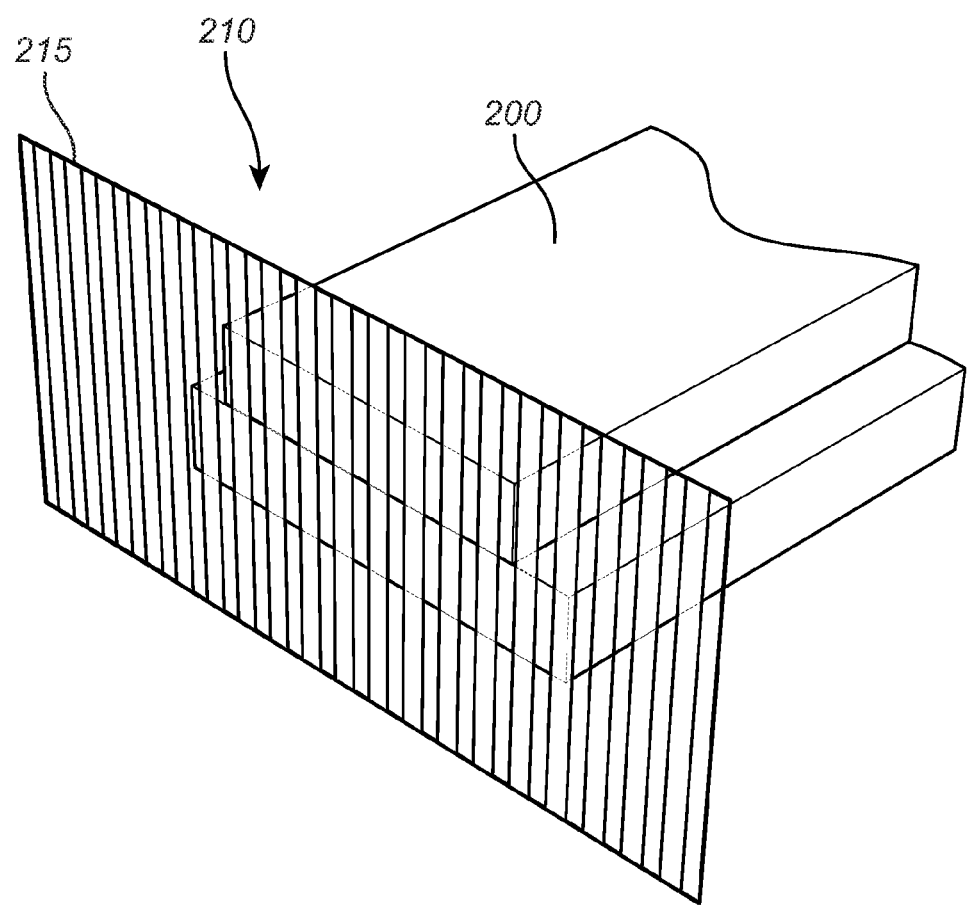
FIG. 5 is a close-up view of an illumination waveguide with a patterned mirror in the form of a diffraction grating in proximity to a side surface of the illumination waveguide.

FIGS. 3-5 illustrate alternative ways of implementing a patterned mirror 210. As shown in FIG. 3 a patterned mirror 210 may comprise a ridge 213 and a valley 214 in a side surface of the illumination waveguide 200. The side surface may thus be a corrugated surface such that light being reflected from the corrugated side surface and reflected back into the illumination waveguide 200 has a different phase depending on whether it is reflected from a ridge or a valley. The ridge and valley may e.g. be lithographically defined on the top surface of the illumination waveguide 200 and then etched out down to the substrate 102. As shown in FIG. 4 a patterned mirror 210 may comprise a photonic crystal 216, the photonic crystal 216 comprising a plurality of holes 217 periodically arranged in the illumination waveguide 200. The plurality of holes 217 may e.g. be lithographically defined on the top surface of the illumination waveguide 200 and then etched out. As shown in FIG. 5 a patterned mirror 210 may comprise a diffraction grating 215 in proximity to a side surface of the illumination waveguide, the diffraction grating comprising a plurality of light reflective lines. The diffraction grating 215 may e.g. be a ruled diffraction grating or a holographic diffraction grating. The diffraction grating 215 may e.g. be butt coupled to the side surface of the illumination waveguide 200. The illumination waveguide 200 may herein be a layer on top of a substrate 102 wherein the layered structure is e.g. cleaved or diced such that the side surface of the illumination waveguide 200 lies in the same plane as the side surface of the substrate. The diffraction grating 215 may thus be placed in proximity to the side surface of the illumination waveguide 200 without being obstructed by the substrate.

Figure 6:
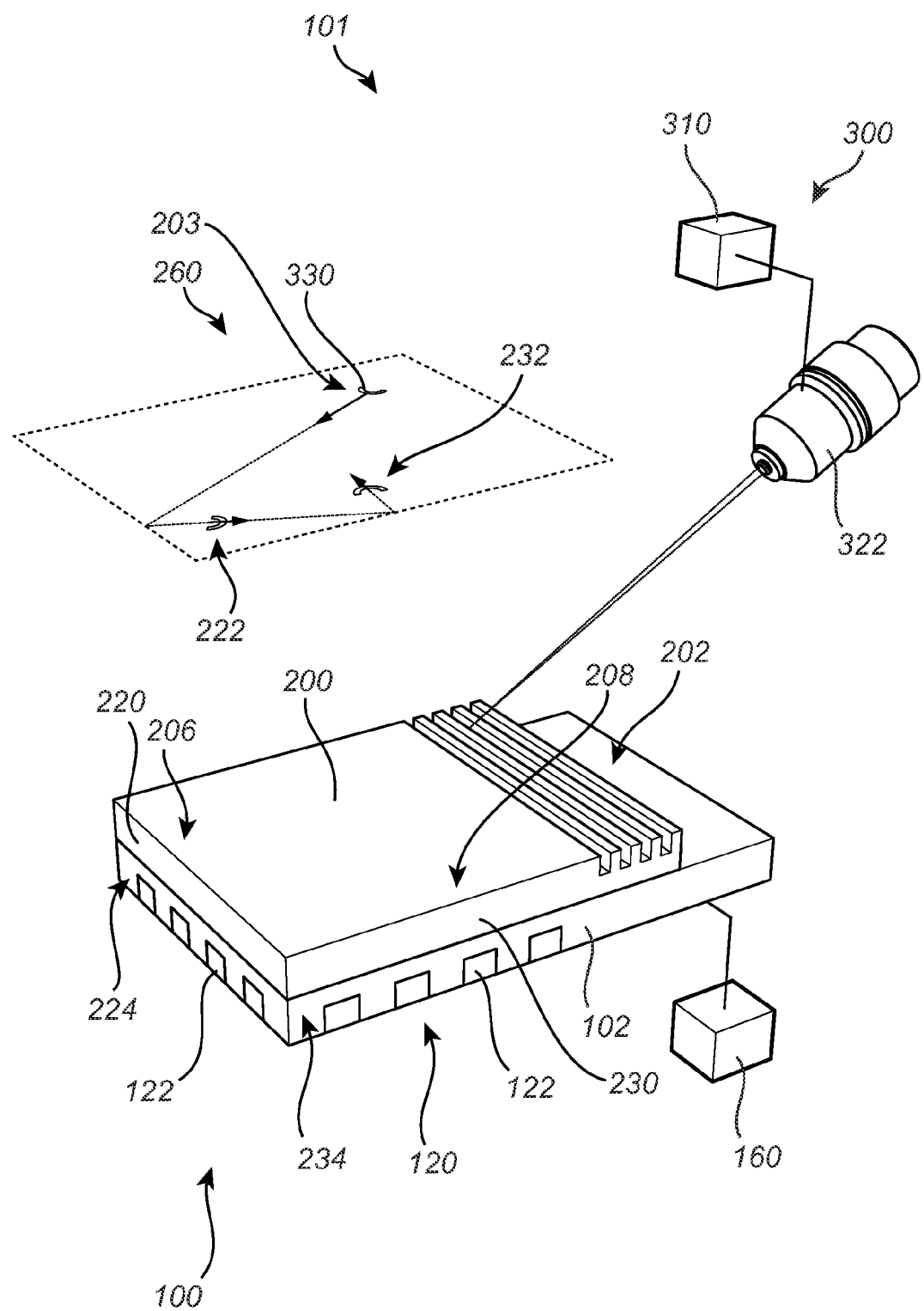
FIG. 6 is a perspective view of an imaging apparatus according to an embodiment.

FIG. 6 illustrates an imaging apparatus 100. The imaging apparatus 100 comprises an illuminator 101 according to an embodiment of the second aspect of the invention. The illuminator 101 comprises a controller 300 and an illumination waveguide 200. The illuminator 101 in FIG. 6 have many features which are similar to the features described in conjunction with the illuminator 101 according to the first aspect in FIG. 1. It should be understood that these features may be implemented in the same way regardless of whether the illuminator 101 is made according to the first or second aspect. For example, the controller 300 may be implemented the same way regardless of whether the illuminator 101 is made according to the first or second aspect. Other features in the imaging apparatus 100 illustrated in FIG. 6 that may be implemented the same way as in FIG. 1 are: the array 120 of light-sensitive areas 122 and the image processing unit 160. However, the mirrors of an illuminator 101 according to the second aspect may be different from the patterned mirror 210 of an illuminator 101 according to the first aspect.

The illuminator 101 in FIG. 6 has an illumination waveguide 200 with a first mirror end 206 and a second mirror end 208. The first mirror end 206 comprises a first mirror 220, configured to reflect at least part of the light wave in the illumination waveguide 200 back as a first reflected wave 222. The second mirror end 208 comprises a second mirror 230, configured to reflect at least part of the light wave or at least part of the first reflected wave 222 back into the illumination waveguide as a second reflected wave 232. FIG. 6 schematically illustrates how the received light wave 203, the first reflected wave 222 and the second reflected wave 232 may move within the guiding plane 260 of the illumination waveguide 200. The illustrated guiding plane 260 with the received light wave 203, the first 222 and second 232 reflected wave has herein been translated away from the illustrated illumination waveguide 200 for clarity. The illuminator 101 may herein be configured such that at the light paths of at least two of the received light wave 203, the first reflected wave 222 and the second reflected wave 232, overlaps at least partially such that they may interfere.

The imaging apparatus 100 in FIG. 6 comprises a layer structure, the layer structure being the substrate 102 with the planar illumination waveguide 200 on top. In FIG. 6 the layer structure is cleaved or diced such that a first lateral surface 224 is formed, the first lateral surface 224 being a flat surface of the layer structure comprising a lateral portion of each of the layers in the layer structure. Thus, as illustrated, a lateral portion of the illumination waveguide may form a first mirror 220 lying within the first lateral surface 224. Furthermore, in FIG. 6 the layer structure is cleaved or diced such that a second lateral surface 234 is formed, the second lateral surface 234 being a flat surface of the layer structure comprising a lateral portion of each of the layers in the layer structure. Thus, as illustrated, a lateral portion of the illumination waveguide 200 may form a second mirror 230 lying within the second lateral surface 234. At least one of the first 224 and second 234 lateral surface may be a polished surface.

The illumination waveguide 200 in the imaging apparatus 100 in FIG. 6 has, in addition to the first 206 and second 208 mirror ends, a receiving end 202. The receiving end 208 may be configured in a similar fashion to the receiving end 208 of an imaging apparatus 100 according to the first aspect. A light wave received at the receiving end 202 may propagate within the illumination waveguide 200 to reach either the first 220 or second mirror 230. A geometric width of the illumination waveguide 200 measured orthogonally to the propagation direction of the received light wave may be configured such that the geometric width times the refractive index of the illumination waveguide is at least 10000 times larger than the wavelength of the received light wave. This may ensure that the mode spectrum is continuous in the guiding plane.

Figure 7:
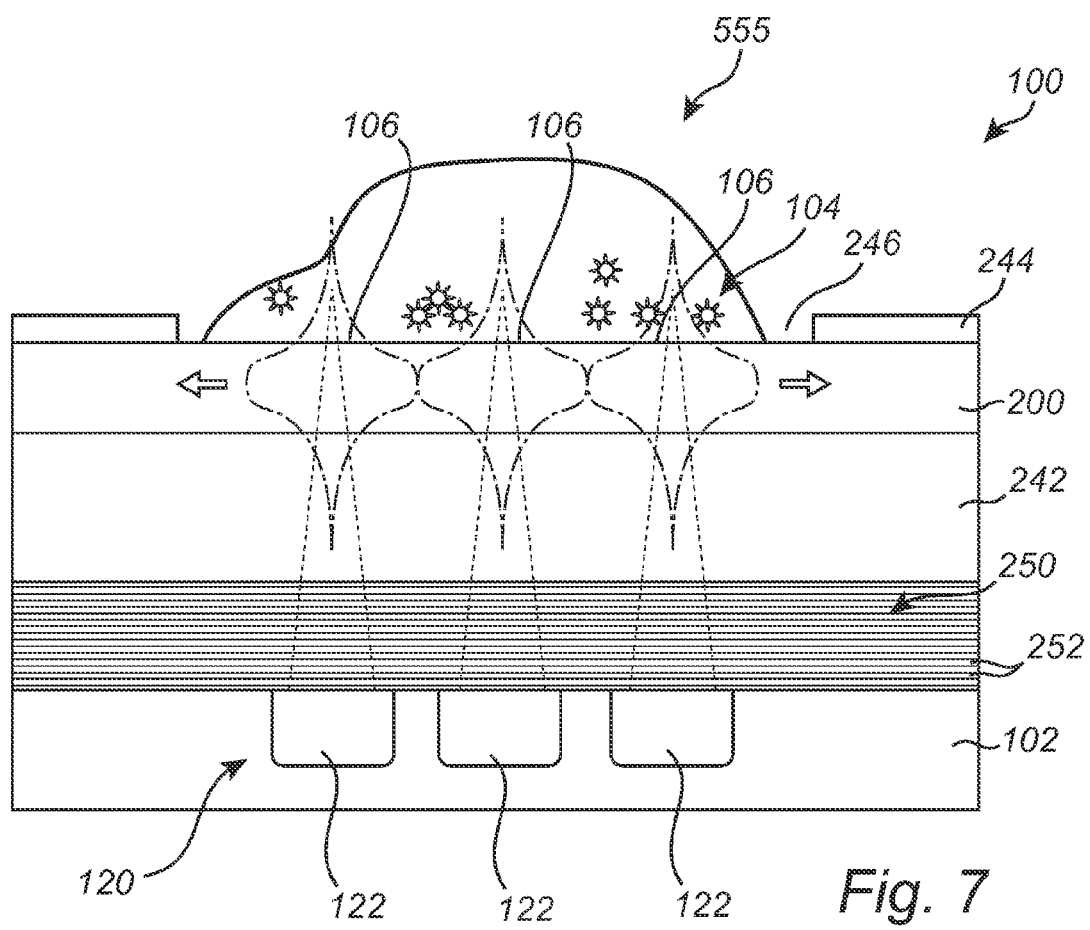
FIG. 7 is a cross-sectional view of an imaging apparatus.

FIG. 7 is a cross-sectional view of an illuminator 101, according to either the first or second aspect of the invention, in an imaging apparatus 100. FIG. 7 shows that the illumination waveguide 200 may be arranged above a bottom cladding layer 242, which may be formed from a material having a lower refractive index than the illumination waveguide 200 so as to ensure that light propagating through the illumination waveguide 200 is subject to total internal reflection at an interface between the illumination waveguide 200 and the bottom cladding layer 242.

Similarly, the illumination waveguide 200 may be arranged below a top cladding layer 244, which may also be formed from a material having a lower refractive index than the illumination waveguide 200 so as to ensure that light propagating through the illumination waveguide 200 is subject to total internal reflection at an interface between the illumination waveguide 200 and the top cladding layer 244. The bottom cladding layer 242 and the top cladding layer 244 may be formed from the same material.

The top cladding layer 244 may be provided with one or more openings 246 above the illumination waveguide 200. This implies that an object 555 may be arranged in contact with the illumination waveguide 200 at the opening 246 in the top cladding layer 244. For instance, the imaging apparatus 100 may be provided with fluidic channel(s) for allowing a sample to be arranged in contact with the illumination waveguide 200. Alternatively, the opening 246 may provide an open space into which an object 555 or sample may be placed in contact with the illumination waveguide 200.

The opening 246 in the top cladding layer 244 may be larger than an area of the illumination waveguide 200 which is used for imaging of the object. This implies that any diffraction or other influence on light propagating through the illumination waveguide 200 at an edge of the top cladding layer 244 facing the opening 246 may be diminished before light reaches a portion of the object to be imaged.

The illuminator 101 is configured to form an interference pattern 104 in the illumination waveguide 200. Thus, an interference pattern 104 comprising at least one element 106 of constructive interference may be formed at a top surface of the illumination waveguide 200 facing the object. This implies that the at least one element 106 may provide a selective illumination of the object, such that the at least one element 106 selects portion(s) of the object being illuminated. Thus, a structured illumination pattern is formed in the illumination waveguide 200, which may be used for defining a resolution of imaging of the object.

The illumination waveguide 200 may extend in a two-dimensional plane such that a surface which has a large extension in two dimensions may be used for illuminating the object. This implies that an object may be illuminated in two dimensions using the interference pattern 104 for selecting which portion(s) of the object are illuminated at a certain point of time. The illumination waveguide 200 may extend over a size of several mm2 so as to enable imaging of a relatively large field of view.

The imaging apparatus 100 may further comprise a filter 250 between the array 120 of light-sensitive areas 122 and the bottom cladding layer 242. The filter 250 may be configured to selectively transmit a wavelength or band of wavelengths of interest. This may be especially needed when the imaging apparatus 100 is used for detecting fluorescence light from the object. The filter 250 may thus be configured to transmit fluorescence light and reject excitation light, such that the excitation light does not reach the array 120 of light-sensitive areas 122.

The filter 250 may be formed from a material so as to selectively absorb or reflect light of undesired wavelengths, whereas light of interest from the object are passed by the filter 250.

However, the filter 250 may alternatively be formed by a plurality of layers 252, as illustrated in FIG. 7. The plurality of layers 252 may have appropriate thicknesses, such that light reflected back and forth through a layer will form constructive or destructive interference depending on the wavelength of light. Thus, the filter 250 may be arranged to selectively transmit light depending on wavelength. In an embodiment, the filter 250 may be formed as a Fabry-Perot interference filter or a distributed Bragg reflector.

Figure 8:
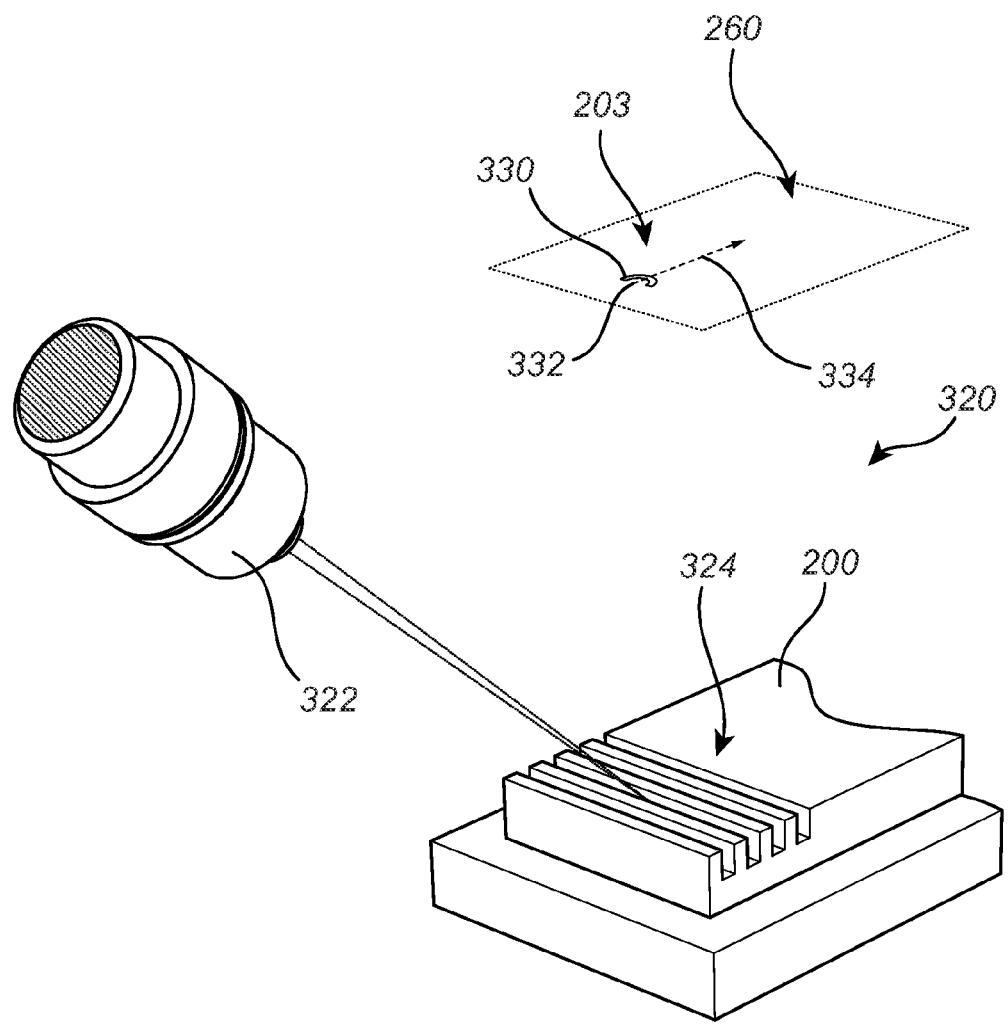
FIG. 8 is a close-up view of a receiving end of an illumination waveguide in an embodiment.
Figure 9:
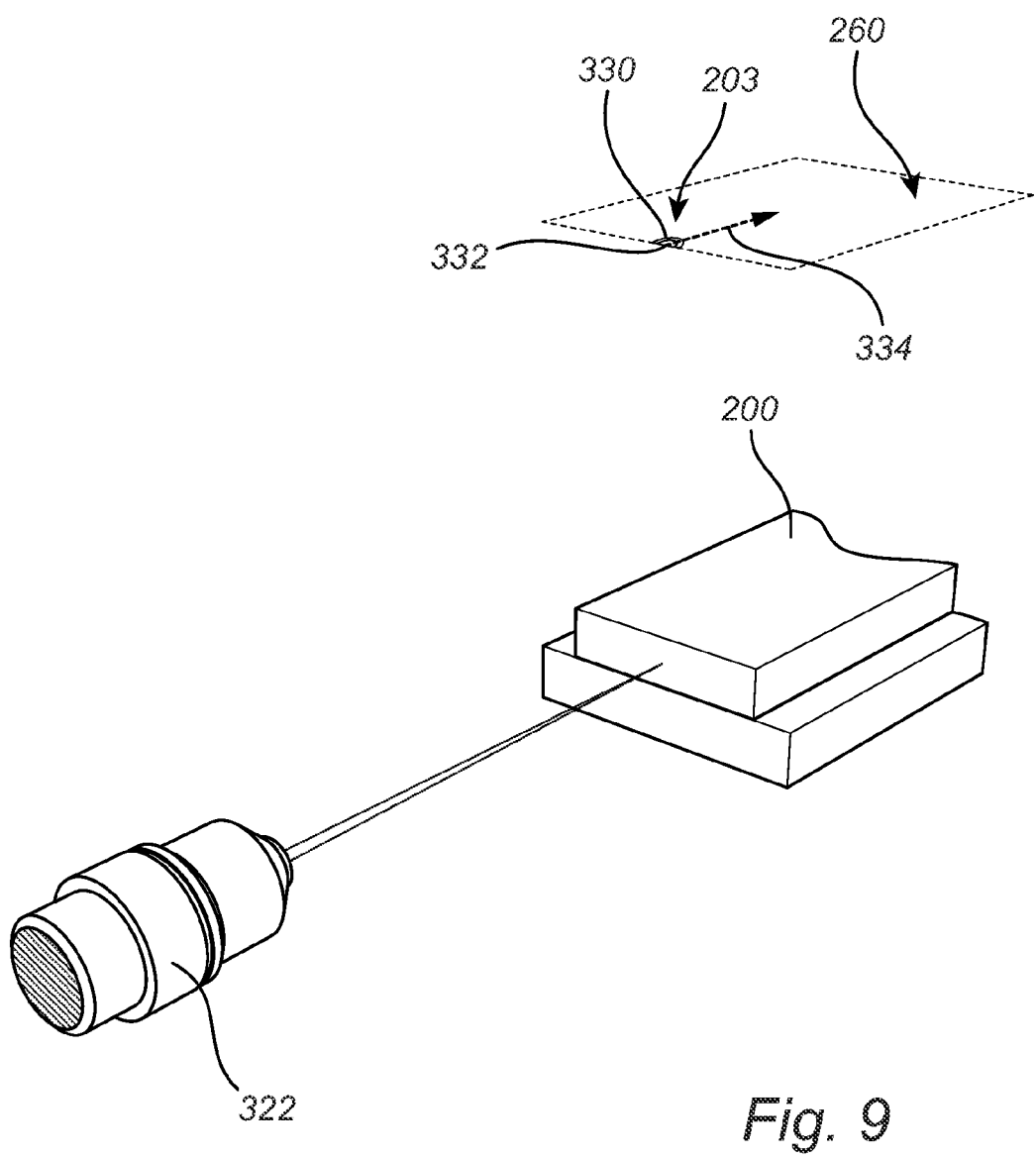
FIG. 9 is a close-up view of a receiving end of an illumination waveguide in an embodiment.

The controller of the illuminator 101 may be configured in many different ways. FIGS. 8 and 9 are close-up views of the receiving end 202 of the illumination waveguide 200 illustrating two different ways of controlling a wavefront 330 of the received light wave such that the interference pattern 104 is controlled. Both the following description of the controller 300 and FIGS. 8 and 9 are applicable to illuminators 101 according to the first aspect as well as to illuminators 101 according to the second aspect.

Referring to FIG. 8, the controller 300 may comprise a light coupler 320. The light coupler may in turn comprise a grating coupler 324 and a movable light source 322. In FIG. 8 the movable light source is a microscope objective which focuses light on the grating coupler 324. The grating coupler 324 in FIG. 8 comprises a plurality of grooves in the illumination waveguide 200. The plurality of grooves may be etched into the illumination waveguide 200. In FIG. 8 the plurality of grooves are etched partially into the illumination waveguide 200, i.e. not all the way through the thickness of the illumination waveguide 200. The movable light source 322 has a position and an illumination direction. The illumination direction may herein be a direction in which light from the movable light source 322 approaches the grating coupler 324.

FIG. 8 schematically illustrates the guiding plane 260 of the illumination waveguide 200 and how a wavefront 330 of the received light wave 203 received by the illumination waveguide 200 may be controlled. The illustrated guiding plane 260 has herein been translated away from the illustrated illumination waveguide 200 for clarity.

By moving the movable light source with a translatory motion relative to the grating coupler 324 the wavefront 330 of the light wave received by the illumination waveguide 200 may be controlled such that the wavefront center position 332 may be changed. The wavefront center position is herein a position at the receiving end 202 of the illumination waveguide 200 where a central part of the wavefront 330 is delivered. The wavefront center position 332 may e.g. be a point in the guiding plane 260 underneath the grating coupler 324 at which the light from the movable light source 322 is focused. Thus, by setting the wavefront center position 332 the propagation of the light wave within the illumination waveguide 200 and how it interacts with e.g. a patterned mirror 210, or a first 220 and second 230 mirror, may be controlled. Consequently, the interference pattern 104 may be controlled.

By moving the movable light source with e.g. a rotating or tilting motion relative to the grating coupler 324 the wavefront 330 of the light wave received by the illumination waveguide 200 may be controlled such that the wavefront propagation direction 334 may be changed. The wavefront propagation direction 334 is herein a direction in which the wavefront 330 propagates away from the receiving end 202 of the illumination waveguide 200 when it is guided by the illumination waveguide 200. The wavefront propagation direction 334 may e.g. be a direction defined by a projection of the illumination direction onto the guiding plane 260. Thus, by setting the wavefront propagation direction 334 the propagation of the light wave within the illumination waveguide 200 and how it interacts with e.g. a patterned mirror 210, or a first 220 and second 230 mirror, may be controlled. Consequently, the interference pattern 104 may be controlled.

Referring to FIG. 9, the controller 300 may comprise a movable light source 322 configured to illuminate a side surface of the illumination waveguide, the side surface may e.g. be an end facet of the illumination waveguide. In FIG. 9 the movable light source 322 is a microscope objective which focuses light on an end facet of the illumination waveguide. By moving the movable light source 322, e.g. using a translatory, rotating or tilting motion, the focus point on the end facet may be moved. Thereby, the wavefront center position and/or the wavefront propagation direction may be controlled such that the interference pattern 104 is controlled.

FIG. 9 schematically illustrates the guiding plane 260 of the illumination waveguide 200 and how a wavefront 330 of the received light wave 203 received by the illumination waveguide 200 may be controlled. The illustrated guiding plane 260 has herein been translated away from the illustrated illumination waveguide 200 for clarity.

It should be understood that the wavefront 330 of the received light wave 203 may also be controlled by changing the wavelength of the light. For example, a grating coupler 220 or another dispersive component on the chip may be illuminated. When the wavelength of the light is changed the dispersion may change e.g. the wavefront propagation direction 334.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An illuminator, the illuminator comprising:
   an illumination waveguide, and a controller;
   the illumination waveguide being a planar waveguide with a receiving end and a mirror end,
      the receiving end being configured to receive a light wave;
      the planar waveguide being configured to confine light in a confinement direction by total internal reflection and guide the light wave in a guiding plane from the receiving end to the mirror end, wherein the confinement direction is normal to the guiding plane;
      the mirror end comprising a patterned mirror configured to reflect at least part of the light wave back into the illumination waveguide as reflected light, the patterned mirror comprising a pattern configured to confer a diffraction pattern to the reflected light, wherein the diffraction pattern contributes to an interference pattern in the illumination waveguide, the interference pattern having an evanescent field outside the illumination waveguide, wherein the evanescent field of the interference pattern is configured to illuminate an object in close relation to the illumination waveguide;
   wherein the controller is configured to control a wavefront of the received light wave and to set a relation between the controlled wavefront and the pattern of the patterned mirror such that the interference pattern forms at least one element of constructive interference for selectively illuminating a portion of the object by the evanescent field;
   wherein the controller is further configured to sequentially change the interference pattern by changing the relation between the controlled wavefront delivered to the illumination waveguide and the patterned mirror such that different portions of the object becomes sequentially illuminated.

2. The illuminator according to claim 1, wherein the pattern of the patterned mirror is a periodic pattern.

3. The illuminator according to claim 2 wherein the periodic pattern of the patterned mirror is configured to have a period of 0.1 to 100 times a wavelength of the received light wave.

4. The illuminator according to claim 1, wherein the pattern of the patterned mirror comprises either of:
   a ridge and a valley in a side surface of the illumination waveguide;
   a diffraction grating in proximity to a side surface of the illumination waveguide, the diffraction grating comprising a plurality of light reflecting lines; or
   a photonic crystal, wherein the photonic crystal comprises a plurality of holes periodically arranged in the illumination waveguide.

5. The illuminator according to claim 1, wherein the controller is configured to control the wavefront of the delivered light wave by setting at least one of:
   a wavefront center position, the wavefront center position being a position at the receiving end of the illumination waveguide where a central part of the wavefront is delivered;
   a wavefront propagation direction, the wavefront propagation direction being a direction in which the wavefront propagates away from the receiving end of the illumination waveguide when it is guided by the illumination waveguide.

6. The illuminator according to claim 5, wherein the controller comprises a light coupler, the light coupler comprising:
   a grating coupler, the grating coupler being a plurality of grooves in the illumination waveguide, the plurality of grooves being configured to direct incident light into the illumination waveguide;
   a movable light source configured to illuminate the grating coupler to deliver the light wave, the movable light source having a position and an illumination direction, the movable light source position being a position of the movable light source relative to a position of the grating coupler and the illumination direction being a propagation direction of light from the light source relative to a direction in the guiding plane of the illumination waveguide;
   wherein the light coupler is configured to control the wavefront of the light wave received by the illumination waveguide by setting at least one of:
      the movable light source position such that the wavefront center position is controlled;
      the movable light source illumination direction such that the wavefront propagation direction is controlled.

7. An imaging apparatus comprising an illuminator according to claim 1 and an array of light-sensitive areas, the array of light-sensitive areas being configured to sequentially detect light from the object,
   wherein the sequential change of the interference pattern by the controller is synchronized with the sequential detection of light from the object.

8. The imaging apparatus according to claim 7, the imaging apparatus further comprising an image reconstruction unit, which is configured to receive a sequence of frames from the array of light-sensitive areas and to reconstruct an image of the object based on the sequence of frames.

9. The imaging apparatus according claim 7, wherein the illumination waveguide is integrated on a common substrate on which the array of light-sensitive areas is formed.

10. A system for nucleic acid sequencing, comprising the imaging apparatus according to claim 7.

* * * * *